United States Patent [19]

Desnoux et al.

[11] Patent Number: 5,107,367
[45] Date of Patent: Apr. 21, 1992

[54] OPTICAL DISTRIBUTOR WITH ROTATING MIRROR

[75] Inventors: Valërie Desnoux, Paris; Jean Pelat, Velizy Villacoublay; Michel Thirouard, Bures/Yvette, all of France

[73] Assignee: General Electric CGR SA, Moulineaux, France

[21] Appl. No.: 499,942

[22] Filed: Mar. 27, 1990

[30] Foreign Application Priority Data

Mar. 31, 1989 [FR] France .................. 89 04304

[51] Int. Cl.⁵ .................. G02B 26/08; G02B 27/10; G02B 7/18
[52] U.S. Cl. .................. 359/225; 359/223; 359/618; 359/877
[58] Field of Search .................. 350/484, 486–487, 350/632, 169, 171, 637; 359/225, 199, 220, 221, 223, 234, 236, 838, 839, 871, 872, 629

[56] References Cited

U.S. PATENT DOCUMENTS

| | | | |
|---|---|---|---|
| 3,622,786 | 11/1971 | Walker et al. | 250/77 |
| 4,180,307 | 12/1979 | Tateoka et al. | 359/221 |
| 4,678,289 | 7/1987 | Mattelin et al. | 350/486 |
| 4,705,349 | 11/1987 | Reedy | 350/96.15 |

FOREIGN PATENT DOCUMENTS 3804198 8/1988 Fed. Rep. of Germany .
58-123502 7/1983 Japan .

*Primary Examiner*—Bruce Y. Arnold
*Assistant Examiner*—James Phan
*Attorney, Agent, or Firm*—Nils H. Ljungman & Associates

[57] ABSTRACT

An optical distributor for deflecting a light beam in different directions comprises a single semi-reflecting mirror 30 carried by a motor-driven turntable 31. The mirror is capable of pivoting about an axis 33 when a stop 46 is withdrawn (position Z of the notch and of the stud 38) and of taking up a position 52 in which it does not intercept the light beam 14, in the other positions (X and Y), the mirror intercepts the beam 14 and deflects it in the desired directions.

20 Claims, 9 Drawing Sheets

PRIOR ART

PRIOR ART

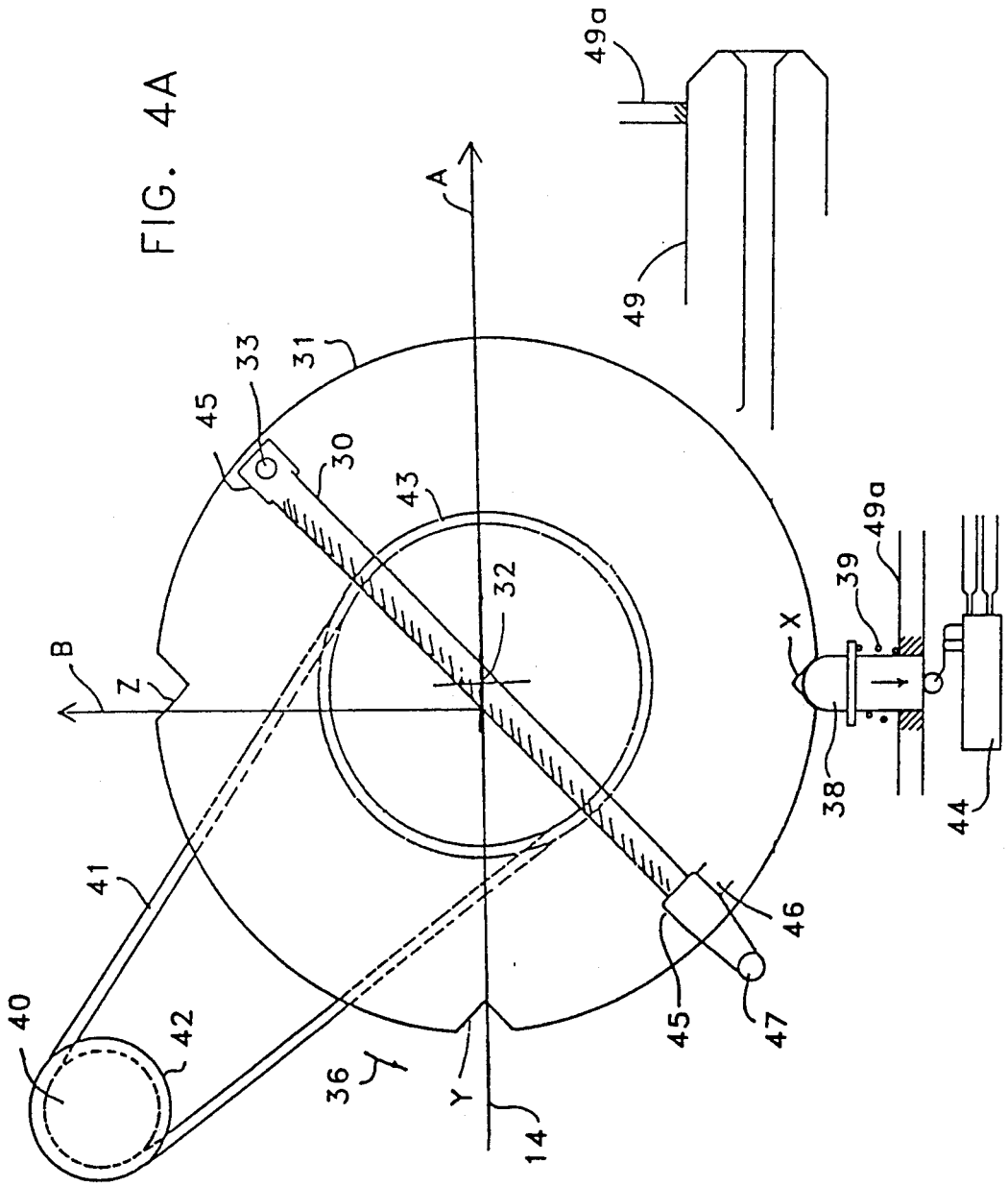

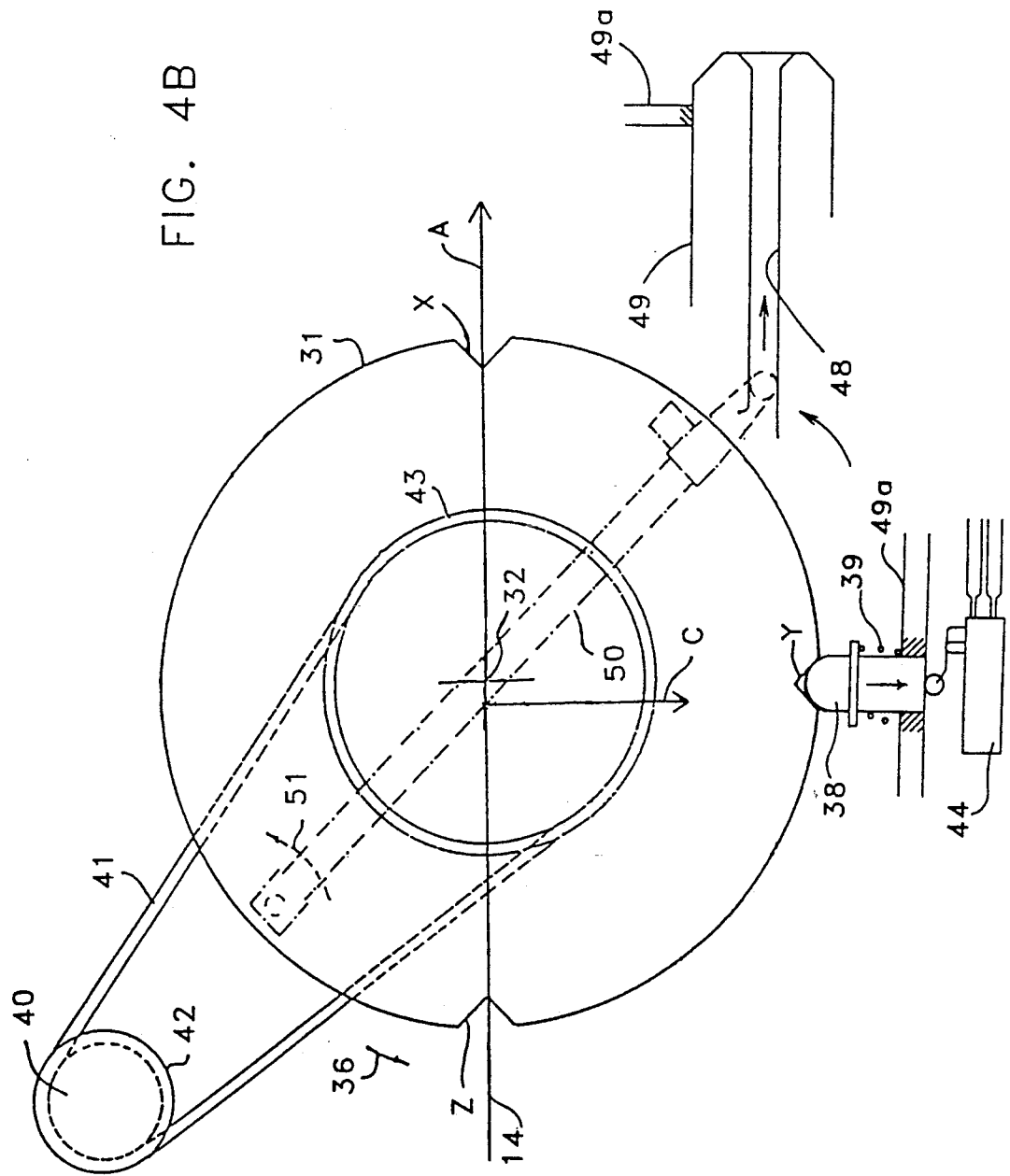

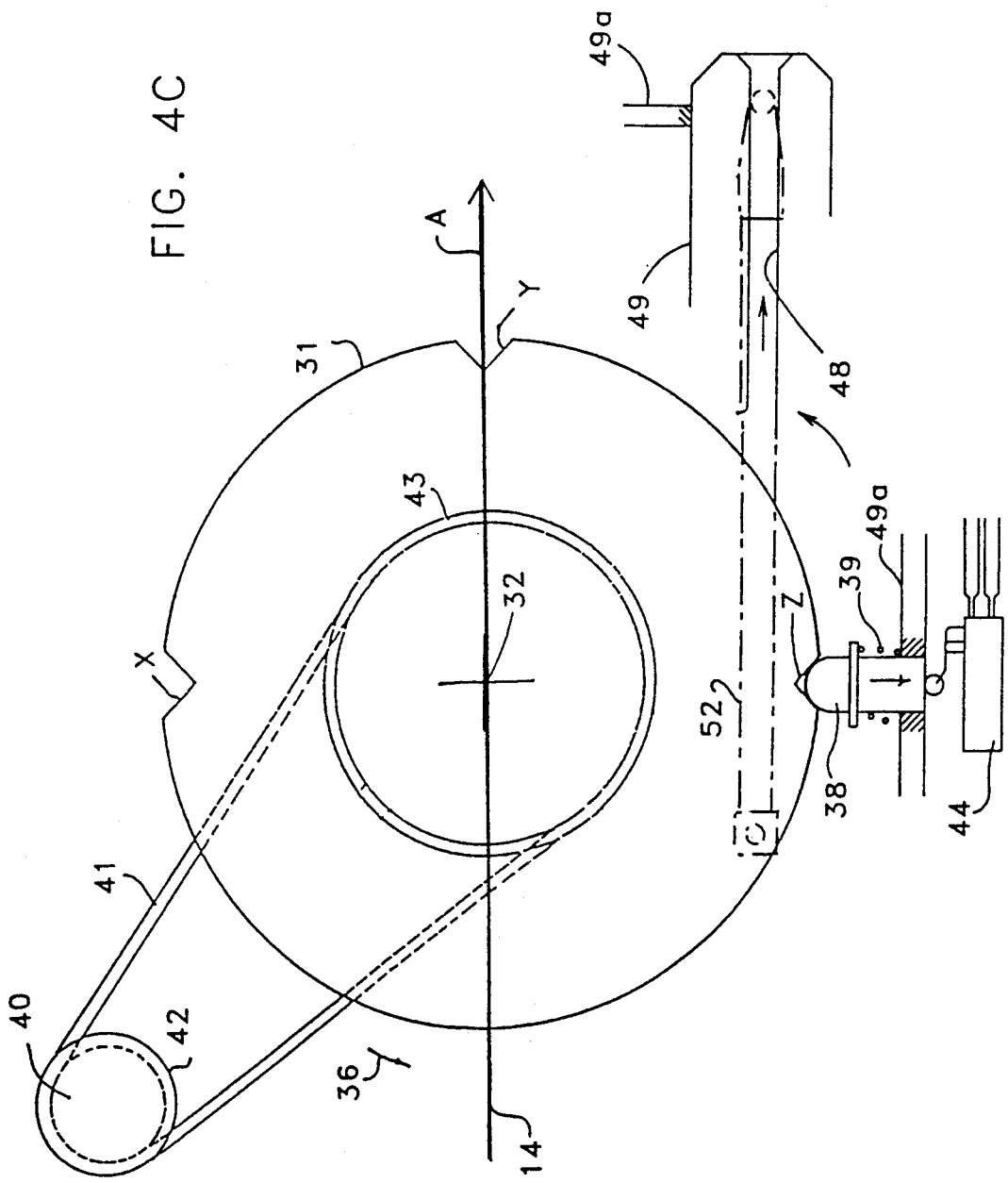

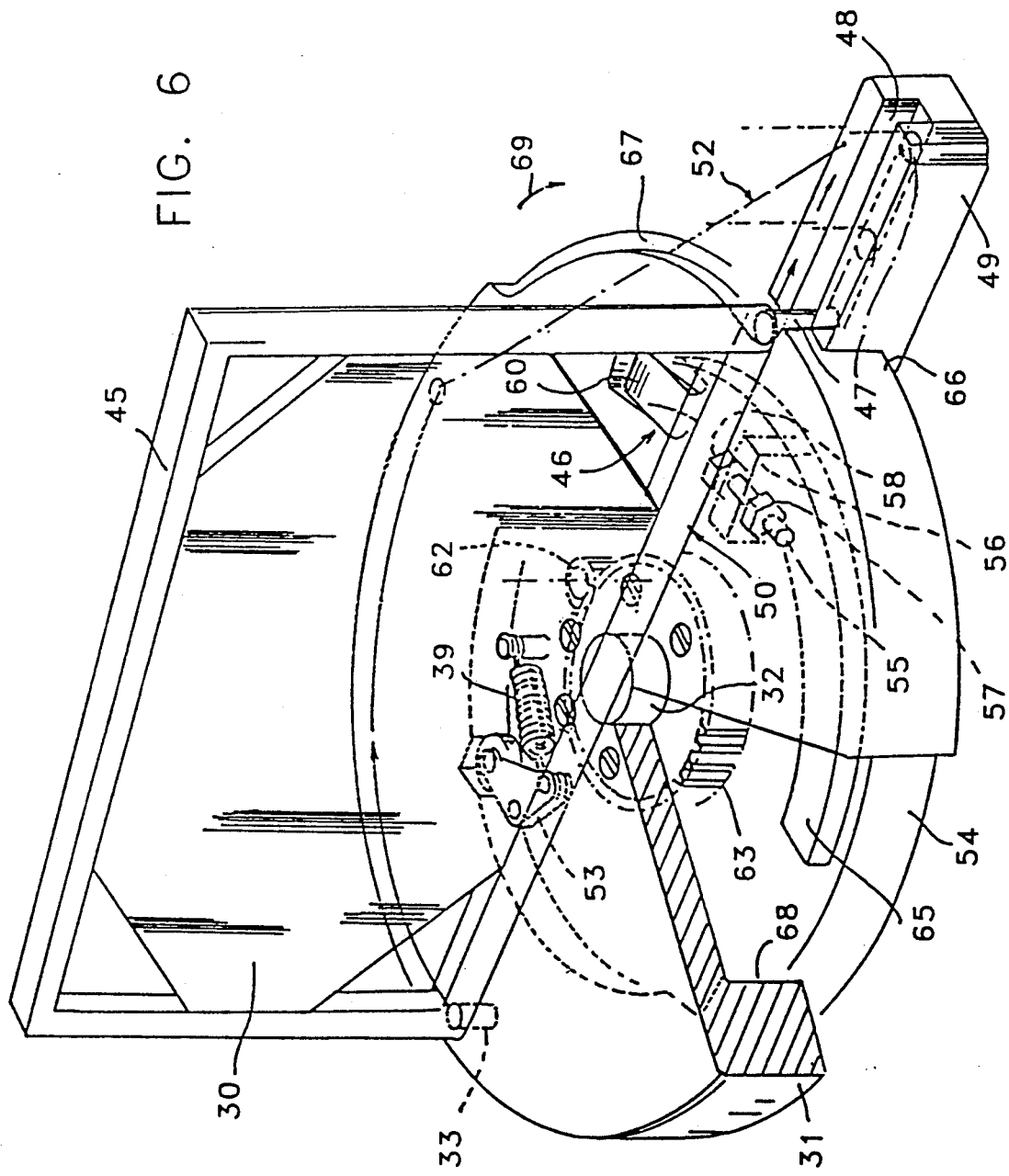

OPTICAL DISTRIBUTOR WITH ROTATING MIRROR

BACKGROUND OF THE INVENTION

1. Field of the Invention

The present invention relates to devices for orienting a light beam in a number of different directions. The invention is more particularly concerned with devices of this type which produce a distribution of the beam in three channels by means of a rotating mirror.

2. Description of the Prior Art

Three-channel optical distributors are already known and are employed, for example, in certain x-ray devices for orienting the light beam produced by the x-radiation/light-radiation converter towards various devices for processing light images. By way of example, these devices consist of a video camera alone, a photographic camera or else a movie camera. Thus it is a usual practice to obtain simultaneously an image on the video camera and the photographic camera or on the video camera and the movie camera, or else an image on the video camera alone.

The schematic FIGS. 1a-1c and 2a-2b of the accompanying drawings show two known ways of constructing three-channel optical devices of this type.

In FIG. 1a-1c, the optical distributor comprises two semi-reflecting mirrors 10 and 11 which pivot respectively about two axes 12 and 13 perpendicular to the plane of the drawing. These two axes 12 and 13 are located on each side of the path of a light beam 14 to be deflected.

In the position of the mirrors of FIG. 1a, the mirror 11 is in a position parallel to the beam 14 and does not intercept this latter whilst the mirror 12 is inclined at 45° with respect to the beam. This mirror deflects a portion of the beam 14 in the direction B which is at 90° with respect to that of the incident beam 14. The other portion passes through the mirror 10 in the direction A.

In the position of the mirrors of FIG. 1b, the mirror 10 is in a position parallel to the beam 14 and does not intercept this latter whilst the mirror 11 is inclined at 45° with respect to the beam. In this case, one portion of the beam 14 is deflected in the direction C which is at 90° with respect to that of the incident beam 14 and at 180° with respect to the direction B. The other portion of the beam passes through the mirror 11 in the direction A.

Finally, in the position of the mirrors of FIG. 1c, the two mirrors 10 and 11 are both parallel to the beam 14 and do not intercept it. In this case, the incident beam 14 is not reflected by a mirror and is therefore not deflected.

The optical distributor which has just been described offers the advantage of being compact but calls for two mirrors, two rotation mechanisms and two rotation motors with accurate positioning in order to reproduce the same angle of slope of the mirrors.

Another three-channel distributor in accordance with the prior art will be described with reference to FIG. 2a and 2b. This distributor has a semireflecting mirror 20 which is inclined at 45° with respect to an incident beam 21. This mirror is fixed on a rotary turret 22 which is rigidly fixed to an arm 23. Said arm pivots about a shaft 24 which is parallel to the beam 21. In regard to the turret 22, this latter is capable of rotating about the axis of the beam 21.

In the position of FIG. 2a, part of the incident beam 21 is transmitted in the direction A and the remainder is deflected in the direction B at right angles to the direction of the incident beam.

If the turret 22 rotates through an angle of 90° in the direction of the arrow 25, part of the incident beam is transmitted in the direction A and the remainder is deflected in the direction C at right angles to the direction of the incident beam and to the direction B.

On the other hand, if the turret rotates through an angle of 90° in the direction opposite to the arrow 25, part of the incident beam is transmitted in the direction A and the remainder is deflected in the direction D at right angles to the direction of the incident beam and to the direction B.

Finally, the pivotal displacement of the arm 23 about the shaft 24 in the direction of the arrow 26 withdraws the turret 22 from the path of the incident beam 21 and this latter is therefore transmitted directly towards A without attenuation.

The optical distributor of FIG. 2 makes it possible to obtain four different optical channels, which is not necessary in the case of an x-ray apparatus but the distributor requires two rotation motors, namely one for the turret 22 and the other for the arm 23 as well as their associated mechanism. Furthermore, the movement of withdrawal of the turret results in substantial overall size.

The aim of the present invention is therefore to provide a rotating-mirror optical distributor which is not subject to the above-mentioned disadvantages of distributors of the prior art and which is of simple and rugged construction.

SUMMARY OF THE INVENTION

The invention relates to a device for deflecting a light beam, essentially comprising a motor-driven turntable rotatably mounted on a shaft which is rigidly fixed to a frame and placed at right angles to the light beam, a semi-reflecting mirror which is carried by the turntable and the reflecting face of which is parallel to the axis of rotation of the turntable, said mirror being normally in position for intercepting the light beam when the turntable rotates so as to deflect said beam in the desired directions, said device being provided with means for causing the mirror to pivot on one side about an axis parallel to the axis of rotation of the turntable so as to withdraw said mirror from the path of the light beam over a predetermined angular range of the turntable with respect to the light beam.

The means for causing the mirror to pivot about its axis of pivotal displacement comprise a stud which is rigidly fixed to the mirror and located on the side opposite to said axis of pivotal displacement, a stop which serves to maintain the mirror in fixed relation to the turntable and withdraws from the start of said angular range and a mechanical part rigidly fixed to the frame and provided with a groove in which said stud is engaged for sliding displacement in respect of said angular range, with the result that the mirror is capable of pivoting about its axis as the turntable rotates within said angular range and is no longer capable of intercepting the light beam.

In the case of three angular positions of the mirror with respect to the beam, the turntable is provided on its periphery with three notches which correspond to said angular positions, said notches being adapted to cooperate with a resilient stud fixed to the frame in order to stop the movement of the turntable when the stud engages within a notch.

When the turntable is caused to rotate by an electric motor, a switch in series with the motor supply circuit is associated with the stud in order to cut-off the supply when the stud is engaged in a notch.

BRIEF DESCRIPTION OF THE DRAWINGS

FIG. 4a is a diagram showing one embodiment of the three-channel automatic distributor in accordance with the invention as well as one position of the mirror.

FIG. 4b is a diagram showing one embodiment of the three-channel automatic distributor in accordance with the invention as well a one position of the mirror.

FIG. 4c is a diagram showing one embodiment of the three-channel automatic distributor in accordance with the invention as well as one position of the mirror.

FIG. 6 is a view in perspective, partly broken away, showing the second embodiment corresponding to FIG. 5.

DESCRIPTION OF THE PREFERRED EMBODIMENTS

Figure 1A:
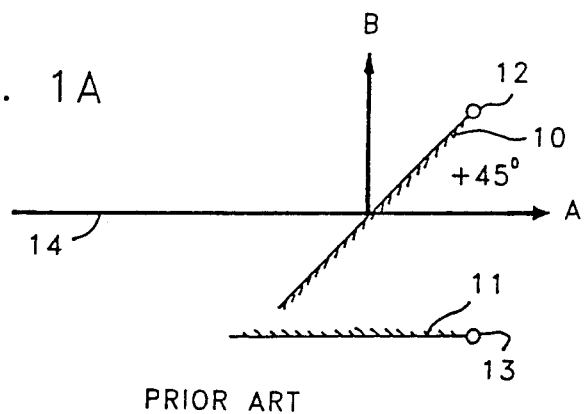
FIGS. 1a, 1b and 1c are schematic views showing the arrangement and operation of a three-channel optical distributor having two rotating mirrors in accordance with the prior art.
Figure 1B:
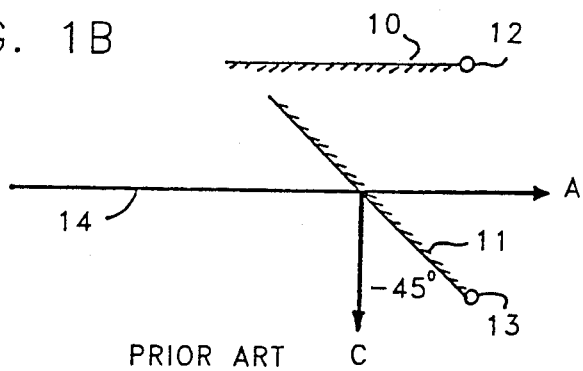
Figure 1C:
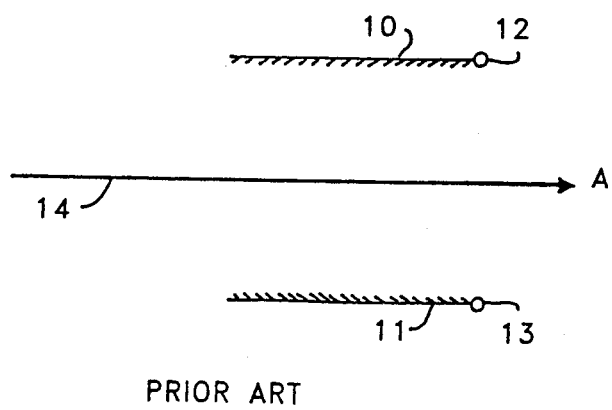
Figure 2A:
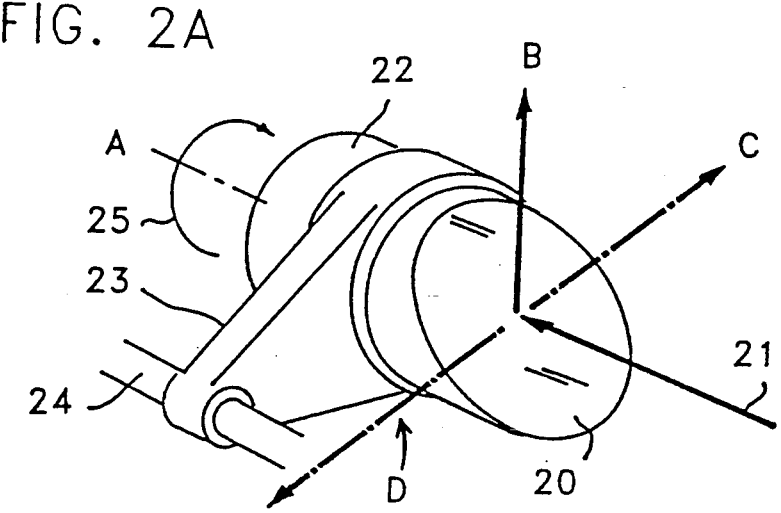
FIGS. 2a and 2b are schematic views showing the arrangement and operation of a four-channel optical distributor in accordance with the prior art.
Figure 2B:
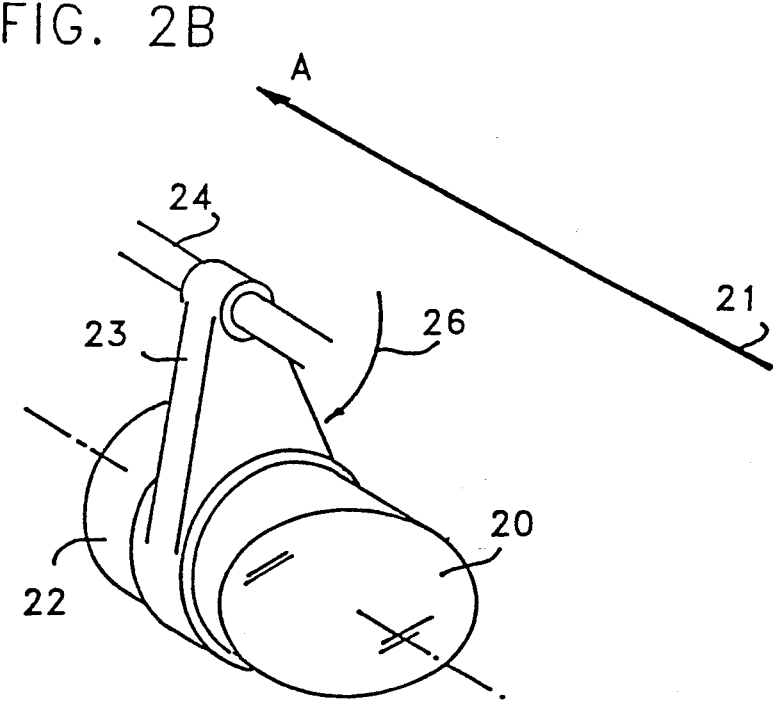
Figure 3A:
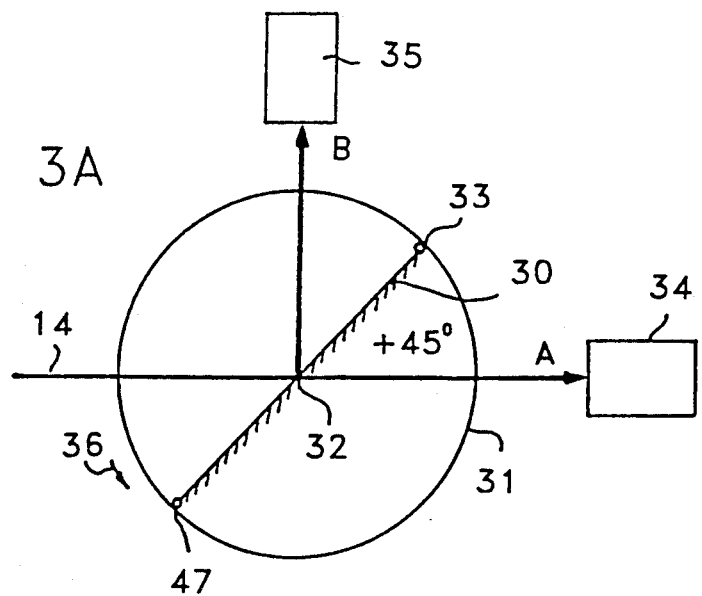
FIGS. 3a, 3b and 3c are schematic views showing the arrangement and operation of a three-channel optical distributor in accordance with the present invention.
Figure 3B:
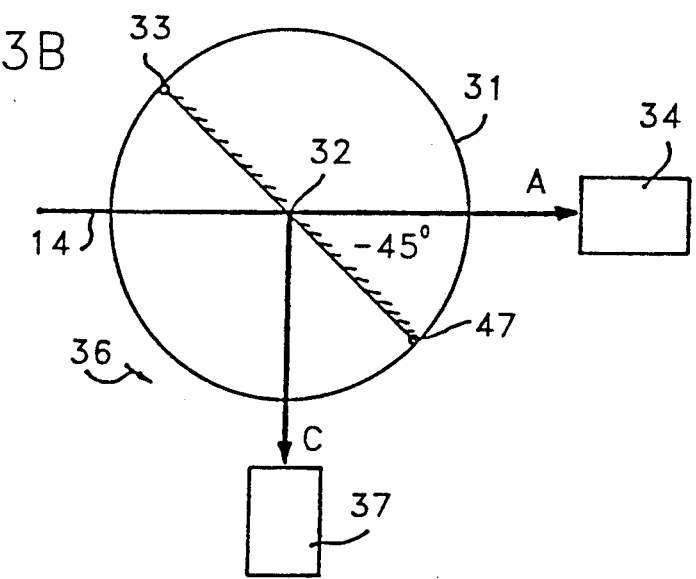
Figure 3C:
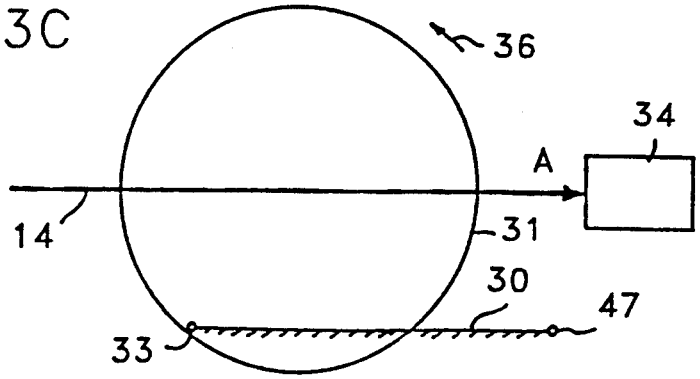

In FIG. 3a, 3b and 3c, there is shown diagrammatically a semi-reflecting mirror 30 mounted on a turntable 31 which rotates about a central axis 32 extending at right angles to the plane of the drawing. The mirror 30 is capable of pivoting about a pin 33 which is rigidly fixed to the turntable 31. Moreover, that side of the mirror 30 which is opposite to the pin 33 has a stud 47 which, in respect of a predetermined angular range of rotation of the turntable 31, is adapted to cooperate with a linear guide (not shown in FIG. 3).

In the position of FIG. 3a, part of the incident beam 14 is transmitted by the mirror 30 in the direction A to a video camera 34 and the remainder of the beam is reflected in the direction B to a photographic camera 35.

In the position of FIG. 3b, that is to say after a rotation of the turntable 31 through an angle of 90° in the direction of the arrow 36, the incident beam 14 is also partly transmitted by the mirror 30 in the direction A to the video camera 34, the remainder of the beam being reflected in the direction C to a movie camera 37.

After an additional rotation of 90° in the direction of the arrow 36, the turntable 31 and the mirror 30 are in the position of FIG. 3c. In other words, the mirror no longer intercepts the incident beam 14 and is located in a so-called "parked" position in which the stud 47 has moved within the linear guide (not shown) progressively as the rotation of the 15 turntable has taken place from the position of FIG. 3b. In this case, the incident beam is transmitted directly and solely in the direction A to the video camera 34.

Figure 4:
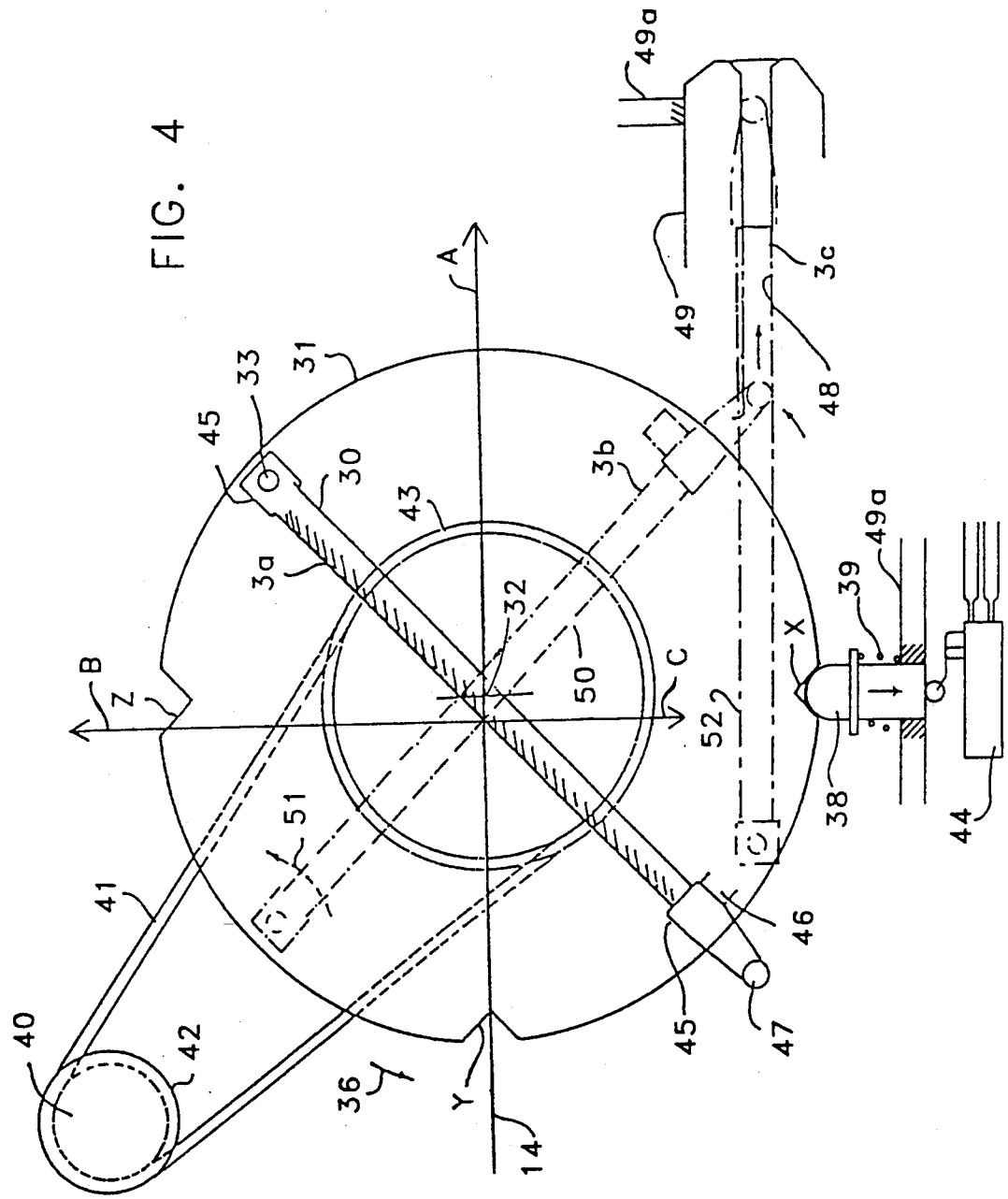
FIG. 4 is a diagram showing one embodiment of the three-channel automatic distributor in accordance with the invention as well as the various positions of the mirror in order to obtain the three channels.

FIG. 4 illustrates a first mode of construction of the three-channel optical distributor in accordance with the invention. The three positions of FIGS. 3a, 3b and 3c are obtained by means of V-shaped notches X, Y and Z formed at the periphery of the turntable 31 and disposed at 90° with respect to each other. The notches are adapted to cooperate with a locking-stud 38 and this latter is rigidly fixed to the frame (not shown) which supports the shaft 32 of the turntable 31. The stud 38 is maintained against the periphery of the turntable 31 by a spring 39. The spring 39 presses against the frame 49a on which frame 49a the stud 38 is fixed to. The turntable 31 is driven in rotation by a motor 40 which is rigidly fixed to the frame, by means of a driving belt 41 which is wound around pulleys 42 and 43, said pulleys being rigidly fixed respectively to the motor 40 and to the turntable 31. The supply of electric current to the motor 40 is controlled in particular by a switch 44 which is associated with the stud 38 so as to ensure that the power supply to the motor 40 is cut-off when the stud is located within any one of the notches X, Y or Z.

As mentioned earlier, the turntable 31 serves as a support for the mirror 30 which is maintained within a rigid frame 45. The mirror 30 is capable of pivoting by means of its frame 45 about an axis 33 which is located at the periphery of the turntable 31 and is perpendicular to the plane of the drawing. In order to prevent pivotal displacement of the mirror, that side of the frame 45 which is opposite to the axis 33 is held in position by means of a locking stop 46 which is rigidly fixed to the turntable 31. Said stop 46 withdraws in respect of certain positions of the turntable, which permits pivotal displacement of the mirror about the axis 33. On the same side as the stop 46, the frame 45 is provided with a stud 47 which, in respect of a predetermined position of the turntable 31, is adapted to engage within a guiding groove 48 formed in a part 49 which is fixed on the frame 49a (not shown in its entirety in the drawings but only partially).

When the stud 38 has engaged in the notch X, the mirror 30 has the position shown in a full line in FIG. 4, which corresponds to the schematic view of FIG. 3a. When, starting from this position, the turntable 31 is driven in rotation by the motor 40 in the direction of the arrow 36, the stud 38 disengages from the notch X but remains in contact with the periphery of the turntable, with the result that it engages in the notch Y when this latter comes into position. As soon as the stud 38 is within a notch X, Y or Z, it interrupts the supply of current to the motor 40. In this position of the notch Y in which the stud 38 has engaged, the mirror 30 has the position 50 shown in chain-dotted lines in FIG. 4, which corresponds to the schematic view of FIG. 3b.

As soon as the turntable leaves the position Y, the stop 46 is withdrawn by making use of means which are not shown in FIG. 4, with the result that the mirror 30 is capable of pivoting about the axis 33 in the direction of the arrow 51 progressively as rotation of the turntable 31 takes place in the direction of the arrow 36. Moreover, the stud 47 engages in the groove 48, with the result that the corresponding side of the mirror moves away from the turntable 31 as this latter rotates. When the notch Z comes into position opposite to the stud 38, the mirror 30 has the position 52 shown in chain-dotted lines, which corresponds to the schematic view of FIG. 3c.

Position Z corresponds to the end position of rotation of the turntable 31 in the direction of the arrow 36. In order to return to position Y and then to position X, the turntable must rotate in the direction opposite to the arrow 36. In this reverse movement, the stud 47 slides within the groove 48 and disengages from this latter in position Y.

At the same time, the retractable stop 46 comes into position so as to lock the mirror on the turntable (position 50). If the reverse movement of rotation continues, there is then a return to the starting position X which is also an end position of the turntable 31. In other words, the turntable 31 can only carry out a movement of rotation through an angle of 180° in one direction or in the other.

In FIG. 4, the position of the mirror 30 which corresponds to the position of the mirror 30 of FIG. 3a is shown in solid lines and denoted by the reference numeral 3a. The position of the mirror 30 which corresponds to the position of the mirror 30 of FIG. 3b is shown in shortened dashed line segments with dots between each of the shortened dashed line segments and denoted by the reference nemeral 3b. The position of mirror 30 which corresponds to the position of the mirror 30 of FIG. 3c is shown in short dashed lines interspersed with long dashed lines and is denoted by the reference numeral 3c.

Analogous to FIG. 3a the incident beam 14 shown in FIG. 4 is transmitted by the mirror 30 in the direction A and the remainder of the beam 14 is reflected in the direction B when the mirror is in the position denoted by 3a.

Analogous to FIG. 3b the incident beam 14 is transmitted by the mirror 30 in the direction A and the remainder of the beam 14 is reflected in the direction C when the mirror 30 is in the position denoted by 3b.

Analogous to FIG. 3c the incident beam 14 is transmitted through the mirror 30 or reflected thereby when the mirror 30 is in the position denoted by 3c.

In FIG. 4a, the incident light beam 14 is shown transmitted by the mirror 30 in the direction A and the remainder of the beam 14 is reflected in the direction B.

In FIG. 4b, the incident light beam 14 is shown transmitted by the mirror 30 in the direction A and the remainder of the beam 14 is reflected in the direction C.

In FIG. 4c, the incident light beam 14 is neither transmitted through the mirror 30 or reflected thereby.

Figure 5:
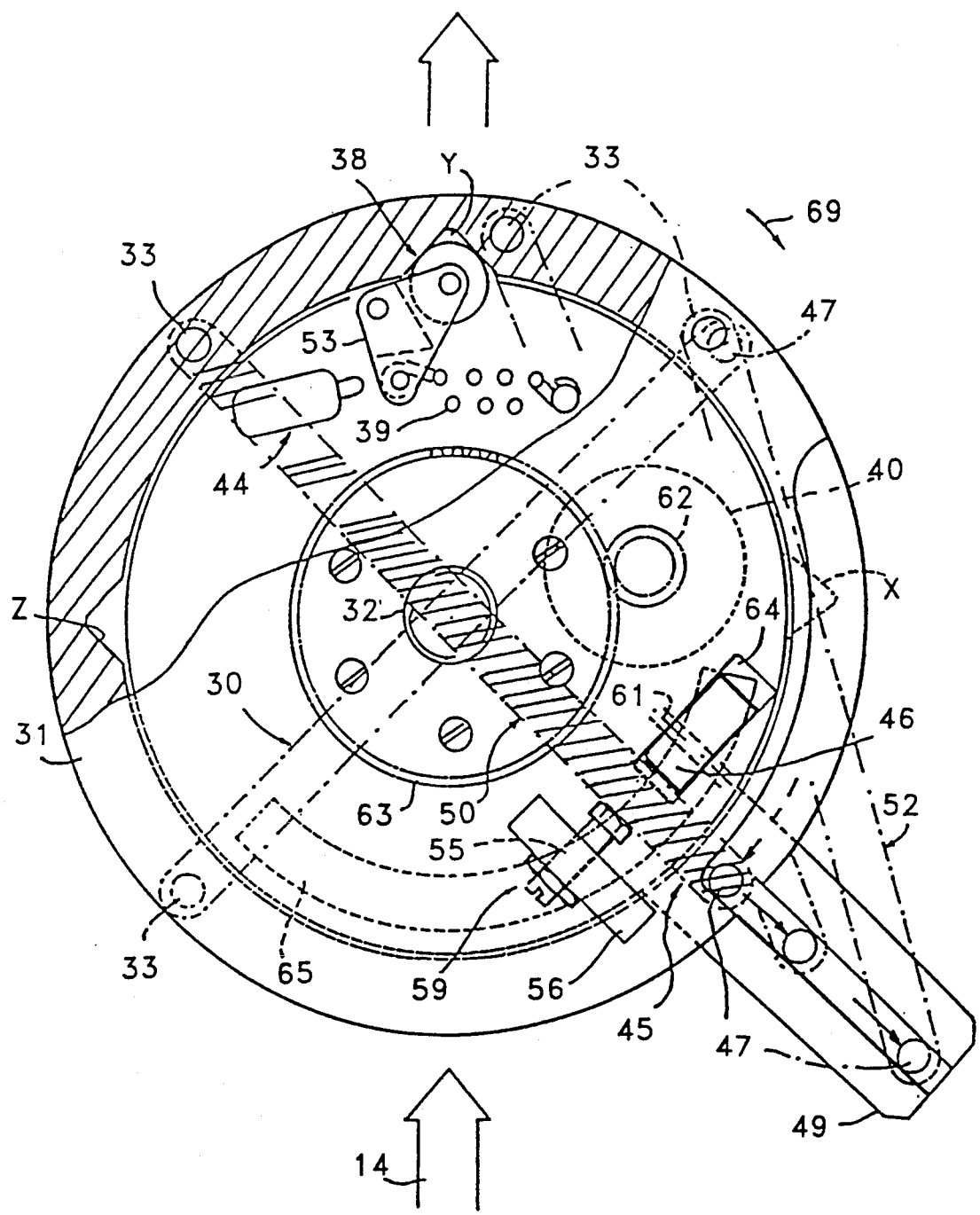
FIG. 5 is a top view, partly broken away, showing a second embodiment of the optical distributor in accordance with the invention.

FIGS. 5 and 6 show in detail another example of construction of the optical distributor in accordance with the invention. In these figures, elements which are identical or similar to those of the preceding figures are designated by the same references. Moreover, the position of the mirror 30 which has been illustrated is that of the notch Y in which the stud 38 has engaged. In this embodiment, the stud is designed in the form of a roller mounted on an oscillating arm 53 which maintains the roller within the notch by means of the spring 39. By cooperating with the switch 44, the arm 53 interrupts the power supply to the motor 40. It will be noted that the different notches X, Y and Z are located on the internal peripheral flange 68 of the turntable 31.

The turntable 31 which is rigidly fixed to a toothed wheel 63 rotates about the shaft 32 carried by a frame 54 (as shown in FIG. 6). The toothed wheel 63 directly engages a toothed pinion 62 carried by the shaft of the motor 40. The mirror 30 is maintained in position on the turntable 31 by two stops, one stop being retractable and designated by the reference 46 and the other stop being stationary and adjustable and designated by the reference 59.

The stop 59 is constituted by a device having a threaded rod 55 which is screwed on a shouldered element 56 of the turntable 31 and one end of which comes into contact with the lower portion of the frame 45. Screwing or unscrewing of the rod 55 permits accurate adjustment of the angular position of the mirror 30. Locking of the rod is obtained by means of nuts 57 and 58.

The retractable stop 46 has an arm 60 which oscillates about a shaft 61 carried by the turntable 31 within an opening 64 of this latter. One end of the arm 60 is adapted to cooperate with the frame 45 of the mirror whilst the other end is adapted to cooperate with a circular cam 65 carried by the frame 54. Thus, when said second end is engaged with the cam 65, the first end is no longer in contact with the frame 45, with the result that the mirror is capable of pivoting about the pin 33. On the other hand, when the cam 65 is not engaged, a spring (not shown) maintains the first end against the mirror which is in any case locked by the stationary stop 59.

The mechanical part 49, which is preferably made of teflon and in which the stud 47 is capable of sliding, is so arranged that the groove 48 is directed along a diameter of the turntable. In order that the stud 47 should engage within the groove 48 from the position of the mirror shown in FIG. 6, the lower portion of the part 49 is provided on the sides corresponding to the turntable 31 and the stop 59 with an extension 66 which prevents the mirror from moving beyond this angular position. Moreover, the turntable has a peripheral notch 67 over an angular sector which is sufficient to permit progressive disengagement of the stud 47.

The operation of the optical distributor of FIGS. 5 and 6 is identical with that described in connection with FIGS. 3 and 4. In this case, however, the direction of rotation of the turntable is reversed in regard to the foregoing explanation. In other words, the turntable passes from position X to position Y and to position Z as it rotates in the direction of the arrow 69.

What is claimed is:

1. A device for deflecting a light beam, said device comprising:
    a motor-driven turntable rotatably mounted on a shaft, said turntable having an axis of rotation,
    a partially reflecting and partially transmitting mirror carried by said turntable, said mirror having a reflecting surface, said reflecting surface being parallel to said axis of rotation of the turntable, said mirror being normally in position for intercepting the light beam when the turntable is rotated so as to deflect said beam in desired directions, and
    means for pivoting said mirror about an axis parallel to the axis of rotation of the turntable so as to move said mirror into and out of the path of the light beam over a predetermined angular range of the movement of the turntable with respect to the light beam.

2. A deflecting device according to claim 1, wherein:
    said means for pivoting said mirror about said axis parallel to the axis of rotation of the turntable comprises a stud rigidly fixed to the mirror and located on the side opposite to said axis parallel to the axis of rotation of the turntable, stop means for maintaining the mirror in fixed relation to the turntable, and said stop means being disengaged from the mirror to permit displacement of the mirror so that the mirror is capable of pivoting about its axis as the turntable rotates within said angular range to a position where the mirror is no longer capable of intercepting the light beam.

3. A device according to claim 2, wherein:

said stop means includes a shoulder mounted on said turntable, a rod member extending from said shoulder into contact with said mirror to restrain pivotal movement of said mirror in a preselected direction of angular movement of said mirror relative to the turntable, and means for adjusting the position of said rod member on said shoulder to permit adjustment of the angular position of said mirror.

4. A device according to claim 2, wherein:

said stop means includes a retractable arm positioned in an opening of said turntable, a shaft supported by said turntable and extending through said arm for positioning said arm for oscillating movement on said shaft, a cam stationarily positioned below said arm, said cam having a surface extending in a preselected direction, said arm having one surface normally positioned in contact with said mirror to restrain movement of said mirror and a second surface positioned oppositely of said cam surface, and said second surface being movable into and out of contact with said cam surface upon rotation of said turntable such that when said arm is in contact with said cam surface said arm is pivoted out of contact with said mirror to permit pivotal movement of said mirror on said turntable.

5. A device according to claim 1, further including:

means for stopping and maintaining the turntable in precise predetermined angular positions of said turntable and therefore of the mirror with respect to the beam.

6. A device according to claim 5, wherein:

the means for stopping and maintaining the turntable comprise notches located at the periphery of the turntable and corresponding to said precise positions, a frame, a resilient stud fixed to the frame, and said resilient stud being adapted to engage one of said notches in order to stop the movement of the turntable and to maintain the turntable in a precise position as defined by said notch.

7. A device according to claim 6, wherein: an electric motor is drivingly connected to the turntable for rotating the turntable, a switch positioned in series with the power supply circuit of the motor, and the resilient stud normally maintaining the switch in position to supply power to the motor and being movable to cut-off said supply circuit when engaged in one of the notches.

8. A device according to claim 1, further including;

guide means directed along a diameter of said turntable for moving said mirror out of the path of the light beam when said turntable has rotated to a preselected position in the predetermined angular range of movement of said turntable.

9. A device according to claim 8, wherein:

said guide means includes a stud positioned on the side of said mirror oppositely of said means for pivoting said mirror on said turntable, a mechanical part rigidly fixed relative to said turntable and including a groove for receiving said stud when said turntable reaches said preselected position in the predetermined angular range of movement thereof, and means for directing said stud into said groove at said preselected position in the range of angular movement of said turntable such that said mirror pivots on said turntable as said turntable continues to rotate to move said mirror out of the path of the light beam.

10. A device according to claim 9, wherein:

said means for directing said stud into said groove includes a notch positioned on the periphery of said turntable, said notch extending over an angular sector of said turntable corresponding to said predetermined angular range and having an end portion, said groove extending from said notch end portion, said stud being positioned in said notch for movement through said angular sector of said turntable upon rotation of said turntable over said predetermined angular range, and means positioned in said notch at said end portion thereof for direction said stud from said notch into said groove to permit said mirror to pivot as said turntable rotates so that said mirror is withdrawn from the path of the light beam.

11. A device for deflecting a light beam, said device comprising:

a turntable rotatably mounted on a shaft, said turntable having an axis of rotation, a partially reflecting and partially transmitting mirror carried by the turntable and having a reflecting surface positioned parallel to the axis of rotation of the turntable, said mirror being normally in a position for intercepting the light beam when the turntable is rotated so as to deflect said beam in the desired directions, and means for pivoting the mirror about an axis parallel to the axis of rotation of the turntable so as to move said mirror into and out of the path of the light beam over a predetermined angular range of the turntable with respect to the light beam.

12. A device for deflecting a light beam, said device comprising:

a turntable rotatably mounted on a shaft, said turntable having an axis of rotation, a partially reflecting and partially transmitting mirror carried by the turntable and having a reflecting surface positioned parallel to the axis of rotation of the turntable, and said mirror being normally in a position for intercepting the light beam when the turntable is rotated so as to deflect said beam in desired directions.

13. A device according to claim 12, further including:

means for pivoting said mirror about an axis parallel to the axis of rotation of said turntable, and stop means for maintaining the mirror in fixed relation to said turntable to intercept the light beam over a predetermined angular range of movement of said turntable.

14. A device according to claim 13, further including:

means for disengaging said stop means to permit pivotal movement of said mirror on said turntable when said turntable reaches a preselected position in said predetermined angular range of movement of said turntable so that said mirror moves out of the path of the light beam.

15. A device according to claim 13, wherein:
said means for pivoting said mirror includes a stud rigidly fixed to said mirror and located on a side of said turntable oppositely of said axis of rotation of said turntable, and
guide means positioned adjacent to said turntable for receiving said stud when said turntable reaches a preselected position in said predetermined angular range of movement to slidingly displace said stud as said turntable continues to rotate and move said mirror out of the path of the light beam to permit the light beam to pass without being deflected by said mirror.

16. A device according to claim 13, wherein:
said stop means includes a shoulder mounted on said turntable,
a rod member extending from said shoulder into contact with said mirror to restrain pivotal movement of said mirror in a preselected direction of angular movement of said mirror relative to the turntable, and
means for adjusting the position of said rod member on said shoulder to permit adjustment of the angular position of said mirror.

17. A device according to claim 13, wherein:
said stop means includes a retractable arm positioned in an opening of said turntable,
a shaft supported by said turntable and extending through said arm for positioning said arm for oscillating movement on said shaft,
a cam stationarily positioned below said arm, said cam having a surface extending in a preselected direction,
said arm having one surface normally positioned in contact with said mirror to restrain movement of said mirror and a second surface positioned oppositely of said cam surface, and
said arm second surface being movable into and out of contact with said cam surface upon rotation of said turntable such that when said arm is in contact with said cam surface said arm is pivoted out of contact with said mirror to permit pivotal movement of said mirror on said turntable.

18. A device according to claim 12, further including:
said turntable having a predetermined angular range of movement, and
guide means directed along a diameter of said turntable for moving said mirror out of the path of the light beam when said turntable has rotated to a preselected position in the predetermined angular range of movement of said turntable.

19. A device according to claim 18, wherein:
said guide means includes a stud positioned on the side of said mirror oppositely of said means for pivoting said mirror on said turntable,
a mechanical part rigidly fixed ratline to said turntable and including a groove for receiving said stud when said turntable reaches said preselected position in the angular range of movement thereof, and
means for directing said stud into said groove at said preselected position in the range of angular movement of said turntable such that said mirror pivots on said turntable as said turntable continues to rotate to move said mirror out of the path of the light beam.

20. A device according to claim 19, wherein:
said means for directing said stud into said groove includes a notch positioned on the periphery of said turntable, said notch extending over an angular sector of said turntable corresponding to said predetermined angular range and having an end portion,
said groove extending from said notch end portion,
said stud being positioned in said notch for movement through said angular sector of said turntable upon rotation of said turntable over said predetermined angular range of movement, and
means positioned in said notch at said end portion thereof for directing said stud from said notch into said groove to permit said mirror to pivot as said turntable rotates so that said mirror is withdrawn form the path of the light beam.

* * * * *

UNITED STATES PATENT AND TRADEMARK OFFICE
CERTIFICATE OF CORRECTION

PATENT NO. : 5,107,367
DATED : April 21, 1992
INVENTOR(S) : Valérie DESNOUX, Jean PELAT, Michel THIROUARD It is certified that error appears in the above-identified patent and that said Letters Patent is hereby corrected as shown below:

On the title page, in the Inventors section, item 75, delete "Valërie", and insert --Valérie--.

On the title page, in the Assignee section, item 73, before 'Moulineaux' insert --Issy es--.

In column 3, line 68, after the second occurrence of 'the' delete --15--.
Column 10:
In Claim 19, line 5, after 'fixed', delete "ratline" and insert --relative--.

In Claim 20, lines 16-17, after 'withdrawn', delete "form" and insert --from--.

Signed and Sealed this

Twenty-eighth Day of September, 1993

Attest:

BRUCE LEHMAN

Attesting Officer     Commissioner of Patents and Trademarks